(12) United States Patent
Herrera et al.

(10) Patent No.: US 7,176,787 B2
(45) Date of Patent: Feb. 13, 2007

(54) METHOD AND APPARATUS FOR VEHICLE DISABLEMENT AND INSTALLATION OF SYSTEM THEREOF

(76) Inventors: Humberto Herrera, 152 E. Aliso St., Pomona, CA (US) 91767; Jack I. J'maev, 12616 Lewis Ave., Chino, CA (US) 91710

( * ) Notice: Subject to any disclaimer, the term of this patent is extended or adjusted under 35 U.S.C. 154(b) by 0 days.

(21) Appl. No.: 10/620,307

(22) Filed: Jul. 15, 2003

(65) Prior Publication Data

US 2005/0012394 A1    Jan. 20, 2005

(51) Int. Cl.
*B60R 25/10* (2006.01)

(52) U.S. Cl. ............... 340/426.11; 340/426.3; 307/10.6

(58) Field of Classification Search ............. 340/426.1, 340/426.11, 825.72, 5.31, 426.22
See application file for complete search history.

(56) References Cited

U.S. PATENT DOCUMENTS

| | | | | |
|---|---|---|---|---|
| 4,854,144 A | * | 8/1989 | Davis | 70/226 |
| 5,918,256 A | * | 6/1999 | Delaney | 73/23.31 |
| 5,933,075 A | * | 8/1999 | Ditson | 340/426.11 |
| 5,937,823 A | * | 8/1999 | Reeder et al. | 123/335 |
| 6,072,248 A | * | 6/2000 | Muise et al. | 307/10.2 |
| 6,091,350 A | * | 7/2000 | Paulos et al. | 341/139 |
| 6,124,805 A | * | 9/2000 | Gabbard | 340/825.72 |
| 6,144,114 A | * | 11/2000 | Chutorash | 307/10.5 |
| 6,371,000 B1 | * | 4/2002 | Hutmacher et al. | 89/1.11 |
| 6,504,472 B2 | * | 1/2003 | Machala et al. | 340/426.1 |
| 2002/0067248 A1 | * | 6/2002 | Howells | 340/426 |
| 2003/0128104 A1 | * | 7/2003 | Lessard et al. | 340/426.11 |
| 2004/0075541 A1 | * | 4/2004 | Simoneau | 340/426.11 |

* cited by examiner

*Primary Examiner*—Daniel Wu
*Assistant Examiner*—George A. Bugg
(74) *Attorney, Agent, or Firm*—Jack Jmaev

(57) ABSTRACT

Means for disabling an automobile by causing an on-board computer to disable the ignition system thereof. A radio receiver provides a signal to the on-board computer through an existing port (e.g. diagnostic port or ignition interface port). The on-board computer disables ignition function through supplanted firmware that recognizes the status of the signal received from the radio receiver. Removal of the radio receiver also disables the ignition system. The entire system is installed during government required inspections (e.g. a smog check).

11 Claims, 6 Drawing Sheets

METHOD AND APPARATUS FOR VEHICLE DISABLEMENT AND INSTALLATION OF SYSTEM THEREOF

FIELD OF THE INVENTION

This invention relates generally to vehicle disablement, specifically to a method for installing and disablement system and the system itself.

BACKGROUND OF THE INVENTION

Automobile chases are becoming quite commonplace in the landscape of our society. This is absolutely astonishing given the fact that law enforcement officials are endowed with such powerful means for apprehending fleeing suspects. Many varied technologies are available for disabling an automobile that is being pursued by the police.

One common method employed by law enforcement to disable a fleeing vehicle is to deploy a tire puncturing device. These types of devices are typically deployed in front of a fleeing suspect in hopes that the tires of the vehicle become compromised. This results in a greatly diminished capacity for speed and generally brings the pursuit to a safe completion. One of the problems with this particular method of disabling a fleeing vehicle is that the tire puncturing device must be deployed ahead of the vehicle. The problem with this notion is that the suspect may choose to alter course at the last minute or otherwise evade the tire puncturing device.

Even more sophisticated means for disabling a fleeing vehicle have now been developed. For example, the electronics in the vehicle may be substantially destroyed, or incapacitated by means of an electromagnetic pulse (EMP). Hence, EMP "guns" are becoming available to disable feeing vehicles. One problem with this technology is that it tends to be indiscriminate. Hence, not only is the suspect's vehicle disabled, but other electronic devices that are inadvertently subjected to the electromagnetic pulse can also be damaged or destroyed.

Also available, both as an aftermarket product and as original equipment in later model automobiles are devices that can disable a moving unless a special electronic key is allowed to interact with the vehicle's ignition system. These systems, though, are not widely deployed and do nothing in the case where the fleeing suspect is in possession of the special electronic key (e.g. the suspect owns the vehicle).

What is needed is a means for terminating a pursuit anymore discriminate manner. Any such means must be capable of disabling the vehicle in a safe and efficient manner. If such a capability is provided in an automobile, one problem that must be overcome is that any additional circuitry necessary to enable the means must be installed in a vast majority of automobiles in order to provide law enforcement an effective means for disabling a fleeing suspect.

SUMMARY OF THE INVENTION

The present invention comprises a method for installing a vehicle disablement system comprising the receipt of the vehicle for some government mandated inspection. Once the vehicle is received further required inspection, a vehicle disablement system may be installed in the vehicle. According to one illustrative variation of the present method, receiving a vehicle for government required inspection comprises receiving a vehicle for emission control inspection. According to yet another illustrative variation of the present method, a disablement system may be installed in the vehicle when it is received for a border crossing inspection.

According to one example method of the present invention, a vehicle disablement system is installed by electrically connecting a radio signal receiver to a computer on board the vehicle and then programming the computer so as to disable the vehicle when a radio signal is either received or not received. According to one example method of the present invention, the radio receiver is connected to a vehicle computer by way of a diagnostic port on the computer. According to yet another example method of the present invention, the radio receiver is connected to the vehicle computer by detaching a vehicle interface harness from a vehicle interface connector on the computer, connecting the radio receiver to the vehicle interface connect and then attaching the vehicle interface harness to the radio receiver. According to yet another illustrative method of the present invention, the radio receiver may be integrated directly into the vehicle's computer. This illustrative method may be used by an original equipment manufacturer that is supplying computers to an automobile manufacturer. In order to ensure that it would be suspect cannot disable the vehicle disablement system, one illustrative method of the present invention provides for programming the vehicle computer to disable the vehicle when the radio receiver is electrically disconnected from the vehicles computer.

The present invention also comprises a vehicle disablement system. According to one example embodiment, a vehicle disablement system comprises a radio receiver that is capable of being electrically connected to a vehicle computer and firmware, that when executed by a processor in the vehicle computer, causes the processor to disable a vehicle when a signal is either received or not received from the radio receiver. According to one example embodiment, the radio receiver comprises an interface as capable of electrical connection to a diagnostic port of a vehicle computer. According to yet another alternative embodiment, the radio receiver comprises an interface capable of connecting to a vehicle computer interface connector and an interface capable of connecting to a vehicle interface harness. According to yet another illustrative embodiment, the radio receiver is integrated directly into a vehicle computer. According to yet another embodiment, the firmware, when executed by the processor, is further capable of causing the processor to sense whether the radio receiver is attached to the vehicle computer. The firmware also causes the processor to disable the vehicle when the radio receiver is not attached to vehicle computer. According to one alternative method, programming the vehicle computer is accomplished by attaching a programming device to the diagnostic port on the vehicle computer, conveying firmware to the vehicle computer that is capable of disabling the vehicle when a signal is received or not received from the radio receiver and then storing the firmware in the vehicle computer.

The present invention further comprises a vehicle computer comprising a processor, memory and disablement firmware. According to one example embodiment, the disablement firmware, when executed by the processor, causes the processor to disable a vehicle when a single is received or not received from a radio receiver. The according to one example embodiment of the invention, the vehicle computer further comprises a radio receiver capable of issuing a disable signal to the processor when a radio signal is received or not received.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

Figure 1:
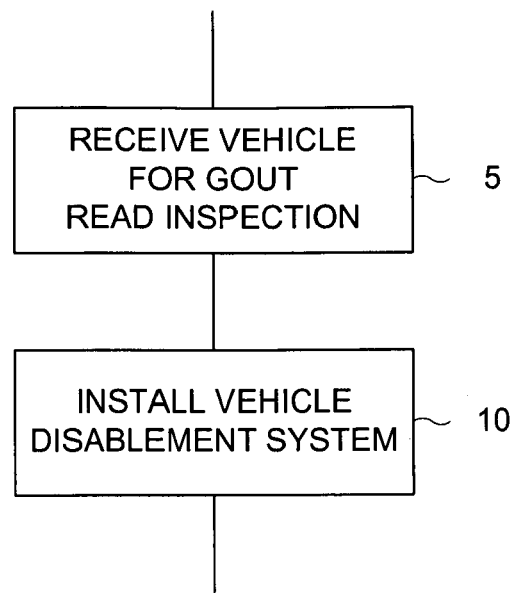
FIG. 1 is a flow diagram of one example method for installing a vehicle disablement system according to the present invention.

FIG. 1 is a flow diagram of one example method for installing a vehicle disablement system according to the present invention. According to one example method, a vehicle is received for government required inspection (step 5). Once the vehicle is received for government required inspection, a vehicle disablement system is installed on the vehicle (step 10). According to one alternative method, the vehicle is received for an emissions control inspection. According to yet another alternative method, the vehicle is received for a border crossing inspection.

Figure 2:
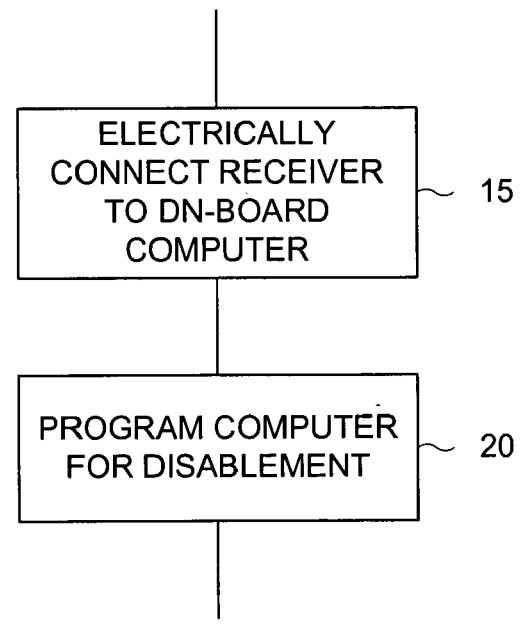
FIG. 2 is a flow diagram of one example method for installing a vehicle disabled system on the vehicle once it is received for a government required inspection according to the present invention.

FIG. 2 is a flow diagram of one example method for installing a vehicle disabled system on the vehicle once it is received for a government required inspection according to the present invention. This example method provides that a radio receiver is electrically connected to an on-board computer in the vehicle (step 15). Once the radio receiver is electrically connected to the on-board computer, the onboard computer is programmed to disable the vehicle (step 20) when a radio signal is either received or not received by the radio receiver. According to one example method, the on-board computer is an ignition control computer. In this case, the ignition functions are disabled by the processor in the on-board computer in order to disable the vehicle. The alternatives of this method provided in one case for receipt of a "disable" signal which is used to cause the on-board computer to disable the vehicle. An alternative method provides that a "keep-alive" signal is received by the radio receiver. In the event that this keep-alive signal is no longer received, the on-board computer is programmed to disable the vehicle.

Figure 3:
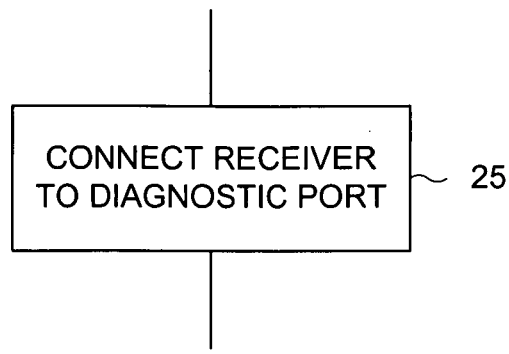
FIG. 3 is a flow diagram that depicts one illustrative method for connecting a radio receiver to an on-board computer according to the present invention.

FIG. 3 is a flow diagram that depicts one illustrative method for connecting a radio receiver to an on-board computer according to the present invention. According to this illustrative method, the radio receiver is connected to the on-board computer by means of a diagnostic port (step 25). Alternatively, the radio receiver may be integrated into the vehicle computer directly.

Figure 4:
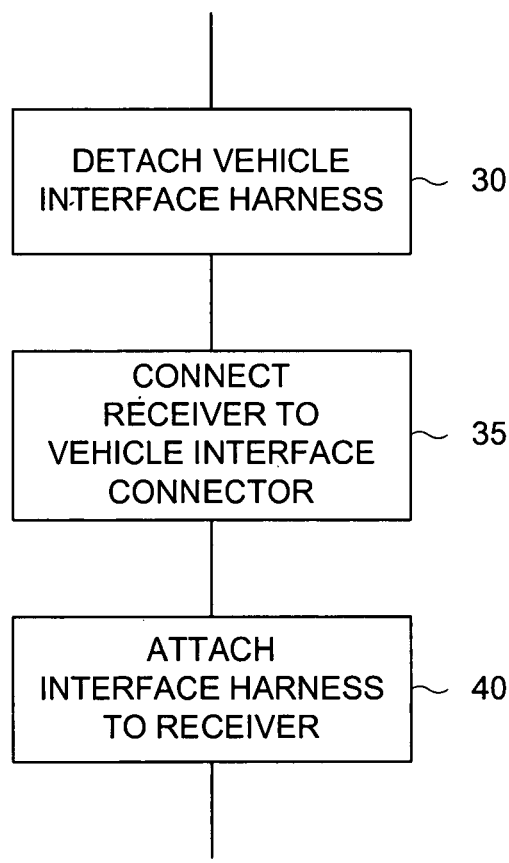
FIG. 4 is a flow diagram that depicts one alternative example method for connecting a radio receiver to an on-board computer according to the present invention.

FIG. 4 is a flow diagram that depicts one alternative example method for connecting a radio receiver to an on-board computer according to the present invention. According to this alternative method, a vehicle interface harness is detached from a vehicle interface harness connector comprising the on-board computer (step 30). The radio receiver is then connected to this interface connector (step 35). The interface harness that was originally removed from the interface harness connector is then attached to the radio receiver (step 40).

Figure 5:
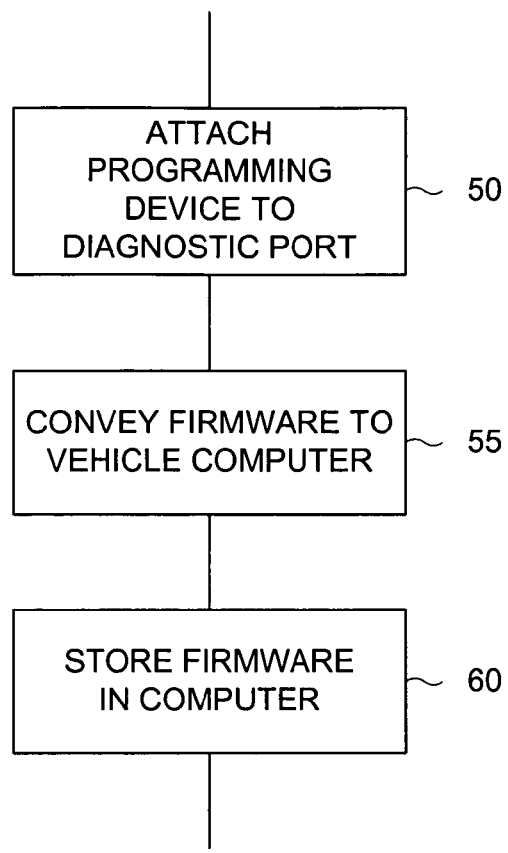
FIG. 5 is a flow diagram that depicts one example method for programming an on-board computer according to the present invention.

FIG. 5 is a flow diagram that depicts one example method for programming an on-board computer according to the present invention. According to this example method, a programming device is attached to a diagnostic port of the on-board computer (step 50). According to one alternative, an interface connector usually used for a vehicle interface harness is used in lieu of the diagnostic port. Firmware that is capable of disabling the vehicle when a signal is received or not received from a radio receiver is then conveyed to the on-or computer (step 55) by means of either the diagnostic port or the interface connector. Then, the firmware is stored in the on-board computer (step 60).

Figure 6:
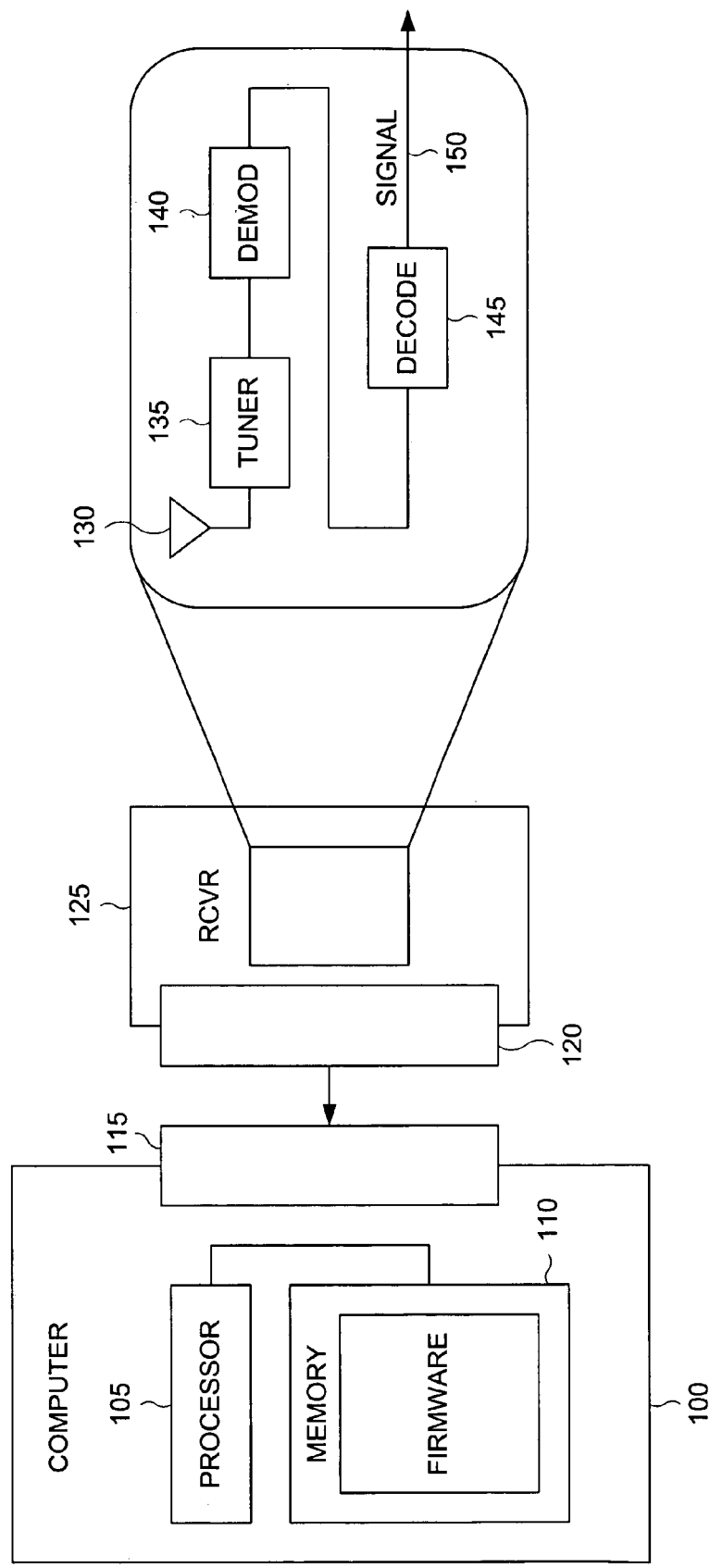
FIG. 6 is a block diagram of a vehicle disablement system that implements the methods of the present invention.

FIG. 6 is a block diagram of a vehicle disablement system that implements the methods of the present invention. According to one example embodiment, a vehicle disablement system comprises a receiver 125 and disablement firmware 101. The disablement firmware 101 is firmware that is loaded into an on-board computer 100. The disablement firmware is firmware that, when executed by a processor 105 in the computer 100, causes the processor to disable the vehicle based on a signal 116 received from the receiver 125. Generally, according to one example embodiment, the receiver comprises an interface connector 120 this capable of mating with a diagnostic port 115 comprising the on-board computer 100.

The receiver 125 itself, according to one illustrative embodiment of the invention, comprises a tuner 135 this capable of selectively amplifying a particular radio frequency. Once the radio frequency is amplified, a demodulator 140 further comprising the receiver 125, extracts information from the selectively amplified signal. The receiver 125 further comprises a decoder 145. According to this example embodiment, the decoder is capable of identifying a particular signal for that is addressed to a particular receiver. When such a signal is recognized, a signal 150 is propagated to the processor 105 in the on-board computer. This signal is used as a basis for determining if the processor should disable the vehicle. According to one example embodiment, the on-board computer is an ignition control computer and the processor disables the ignition functionality based on the signal 150 received from the receiver.

Figure 7:
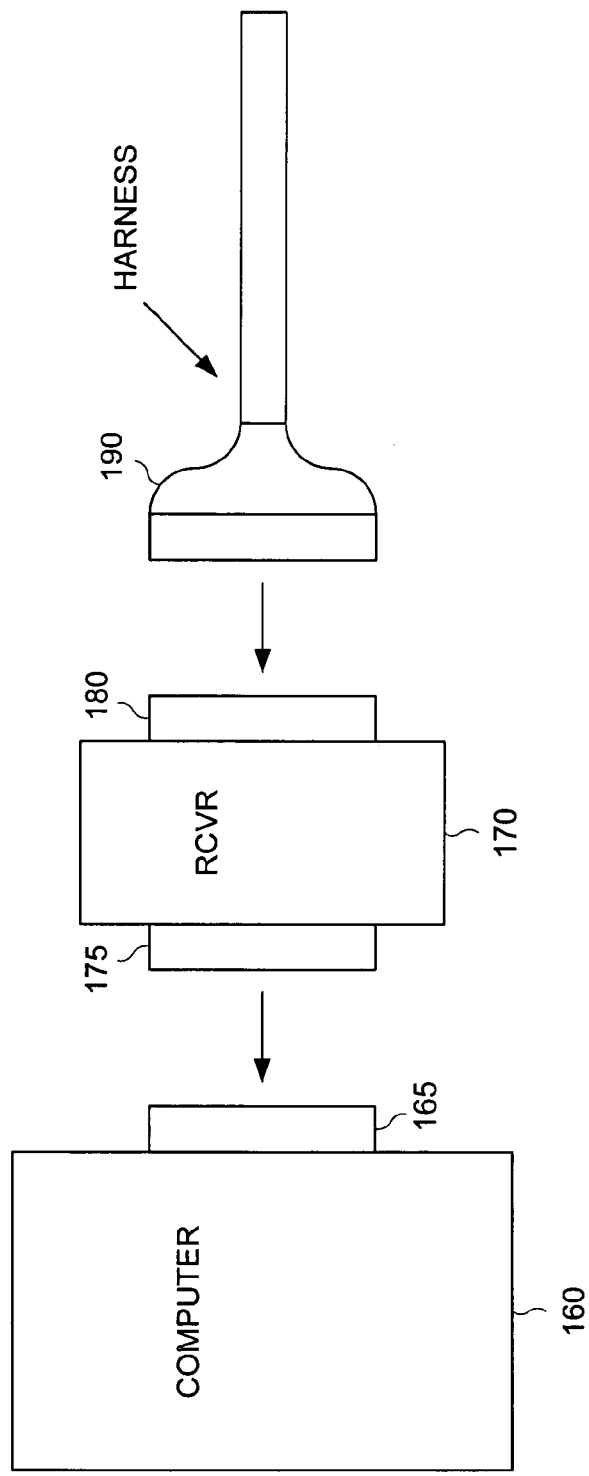
FIG. 7 is a block diagram of one alternative embodiment of a vehicle disablement system according to the present invention.

FIG. 7 is a block diagram of one alternative embodiment of a vehicle disablement system according to the present invention. According to this alternative embodiment, the receiver 170 comprises an interface 175 this capable of connecting to vehicle interface connector 165 comprising the on-board computer 160. The receiver 170 further comprises a vehicle interface harness connector 180 this capable of mating with a vehicle harness 190. This arrangement is much can to a "connector saver" or a computer software anti-piracy "dongle" that may be used on a parallel interface disposed in between a computer and a peripheral (e.g. a printer) attached to the computer by the harness 190. Hence, in application a vehicle harness 190 is detached from its original attachment 165 on the on-board computer 160. The receiver 170 and attaches to that original attachment 165 on the on-board computer 160. The vehicle harness 190 then attaches to the vehicle interface harness connector 180 comprising the receiver 170.

Figure 8:
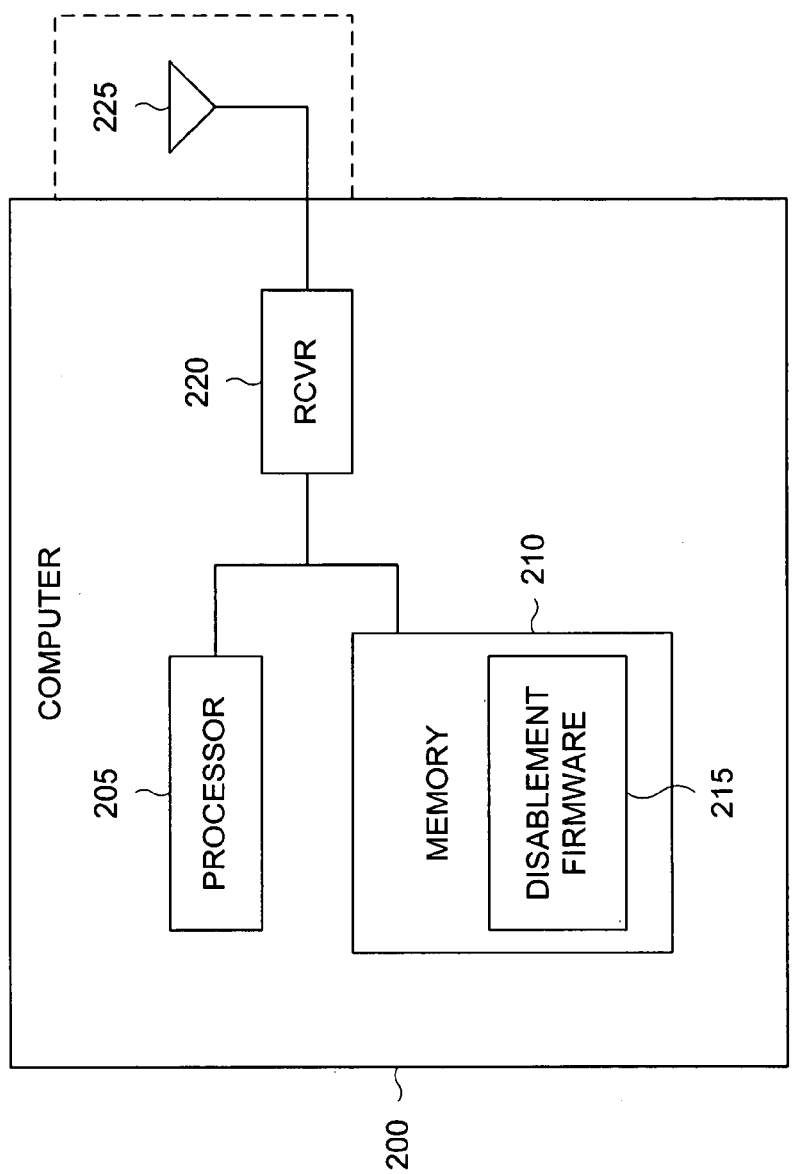
FIG. 8 is a block diagram that depicts an on-board computer wherein a receiver is integrated into the on-board computer during original manufacturer according to the teachings of the present invention.

FIG. 8 is a block diagram that depicts an on-board computer wherein a receiver is integrated into the on-board computer during original manufacturer according to the teachings of the present invention. A vehicle on-board computer 200, according to one example embodiment of the invention, comprises a processor 205 and memory 210. The disablement firmware 215 is stored in the memory 210. As a processor executes the disablement firmware 215, the processor is enabled to disable the vehicle in the event a signal is received from a receiver 220. According to one example embodiment of the on-board computer 200, the on-board computer 200 further comprises said receiver 220. Orange one example embodiment of the invention, the on-board computer 200 further comprises an antenna 225 attached to the receiver 220 for purposes of receiving a radio frequency signal from free-space. The receiver 220 conforms to the description already provided herein. According to the this example embodiment, the disablement firmware causes the processor 205 to receive a signal from the receiver 220. The receiver 220 is capable of receiving two different types of signals. According to one example embodiment, the receiver 220 receives a "disable" signal from free-space. Accordingly, the processor will disable the vehicle when the disable signal is received from the receiver 220. According to another alternative embodiment, the receiver receives a keep-alive signal. As the processor 205 executes the disablement firmware 215, it will disable the vehicle when that keep-alive signal is no longer detected.

According to one example embodiment, a decoder comprises a comparator that is capable of receiving a vehicle identification number from the demodulator. Typically, the decoder further comprises a serial-to-parallel converter. A state machine within the decoder causes the serial-to-parallel converter to receive a serial bitstream from the demodulator into properly frame a command message. This command message comprises the vehicle identification number. The decoder further comprises a receiver identification number that corresponds to a particular vehicle identification number. Hence, each individual receiver is programmed with a unique receiver identification number. When a command message is received and the vehicle identification number in the command message matches the receiver's identification number as indicated by the comparator, a disable (or in the alternative a keep-alive) signal is generated.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method for disabling a vehicle comprising the steps of:
   electrically connecting a radio receiver to a vehicle ignition control computer;
   programming the vehicle ignition control computer to disable the vehicle when a disablement radio signal is received, or in the absence of receiving any radio signal by the radio signal receiver; and
   programming the vehicle computer to disable the vehicle when the radio receiver is electrically disconnected from the vehicle computer.

2. The method of claim 1 wherein the step of electrically connecting a radio receiver to the vehicle ignition control computer comprises connecting a radio receiver to a diagnostic port on the vehicle ignition control computer receiver.

3. The method of claim 1 wherein the step of electrically connecting a radio receiver to the vehicle ignition control computer comprises:
   detaching a vehicle interface harness from a vehicle interface connector;
   connecting a radio receiver to the vehicle interface connector; and
   attaching the vehicle interface harness to the radio receiver.

4. The method of claim 1 wherein the step of electrically connecting a radio receiver to the vehicle ignition control computer comprises integrating a radio receiver into a vehicle computer.

5. The method of claim 1 wherein the step of programming the vehicle ignition control computer comprises:
   attaching a programming device to a diagnostic port on the vehicle ignition control computer;
   conveying firmware to the vehicle ignition control computer that is capable of disabling the vehicle when a signal is received or not received from the radio receiver; and
   storing said firmware in the vehicle ignition control computer.

6. A vehicle disablement system comprising:
   radio receiver capable of being electrically connected to a vehicle ignition control computer; and
   firmware, that when executed by a processor in the vehicle ignition control computer, causes the processor to disable the vehicle when a disablement radio signal is received by the radio receiver or when the radio receiver fails to receive an enablement signal and wherein the firmware further is capable of causing the processor to sense the presence of the radio receiver and is further capable of causing the processor to disable the vehicle when the radio receiver is not present.

7. The vehicle disablement system of claim 6 wherein the radio receiver comprises an interface capable of electrical connection to a diagnostic port of the vehicle ignition control computer.

8. The vehicle disablement system of claim 6 wherein the radio receiver comprises:
   an interface capable of connecting to a vehicle interface connector; and
   an interface capable of connecting to a vehicle interface harness.

9. A vehicle disablement system comprising:
   radio receiver capable of being electrically connected to a vehicle ignition control computer; and
   firmware, that when executed by a processor in the vehicle ignition control computer, causes the processor to sense the presence of the radio receiver and is further capable of causing the processor to disable the vehicle when the radio receiver is not present.

10. The vehicle disablement system of claim 9 wherein the radio receiver comprises an interface capable of electrical connection to a diagnostic port included in the vehicle ignition control computer.

11. The vehicle disablement system of claim 9 wherein the radio receiver comprises:

an interface capable of connecting to a vehicle interface connector; and an interface capable of connecting to a vehicle interface harness.

* * * * *